Figure 1:
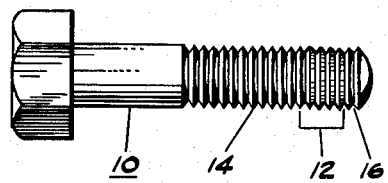

June 20, 1961   R. W. JAMES ET AL   2,989,107
LOCKING COMPOSITION
Filed Jan. 8, 1959

INVENTORS
RAYMOND W. JAMES
RICHARD E. MERRILL
BY
AGENT

United States Patent Office 2,989,107
Patented June 20, 1961

2,989,107
LOCKING COMPOSITION

Raymond W. James, Lexington, and Richard E. Merrill, Wakefield, Mass., assignors to Arthur D. Little, Inc., Cambridge, Mass., a corporation of Massachusetts
Filed Jan. 8, 1959, Ser. No. 785,661
3 Claims. (Cl. 151—7)

This invention relates to compositions for locking threaded members for the purpose of increasing their frictional resistance to withdrawal, and is especially useful for making self-locking bolts. The description which follows will therefore be directed particularly to making such bolts, although it will be obvious that this invention is equally applicable to making self-locking nuts and like threaded members.

A locking composition for a self-locking bolt, in order to be fully satisfactory, must fulfill a considerable number of requirements. Such a locking composition must be tough and cohesive enough that it does not ball up when the bolt is engaged or disengaged, even repeatedly. This composition must also be adhesive to the bolt, so that it is not stripped therefrom during engagement or disengagement. It should also be non-galling, so as to avoid undue thread wear. Another requirement is that the composition be operable on all run-of-mill bolts. This feature is important, as there are slight differences in diameter between the bolts and corresponding nuts of any specified size and thread, due to slight variations in manufacture. The locking composition must also be effective on repeated use, i.e., it must be retained sufficiently on the bolt so that the latter will still lock effectively after several engagements and disengagements. The composition must be of such a character that the bolt can be engaged and disengaged without damage to the bolt head or other parts of the assembly, even though the bolt, when engaged, is securely locked against working loose. Finally, the locking composition must be such that the bolt, when engaged, will not jar loose when subjected to vibration.

The principal object of this invention is to provide a locking composition which has the foregoing characteristics, and which is relatively inexpensive. Other objects will appear as the description proceeds.

The compositions of this invention consist of a normally solid, resinous coating material together with suitable plasticizers and solvents. The solvents are used in preparing the compositions, but are removed during the processing so that they are not present in any significant quantity on the finished bolts. Broadly speaking, the resinous coating material is one which has the viscosity characteristics, as measured by the parallel plate plastometer, hereinafter set forth in detail following the examples.

A particularly satisfactory type of such resinous coating material, in accordance with the present invention, consists of a major amount of a substance having a relatively narrow softening range, and a minor amount of a synthetic polymeric material which has a broad softening range. Both of these materials can be melted if subjected to sufficiently high temperatures.

The solvent-free composition, when present on the threads of a bolt, softens sufficiently because of the frictional heat resulting from engaging or disengaging the bolt so that it readily fills the small free space existing between the threads of the bolt and those of the corresponding nut or tapped hole, and permits insertion or removal of the bolt without damage to it or to the threads. Proper control of the characteristics of the narrow softening range resins and the broad softening range polymeric materials will insure sufficient softening of the composition as the bolt is engaged or disengaged, proper rigidity, without brittleness, when the bolt is in place, and effective cohesion of the composition itself and adhesion thereof to the threads of the bolt.

Suitable narrow softening range resins for the above-mentioned purposes are the hydrogenated esters of rosin which soften in the range of 60 to 100° C. as determined by the ASTM E28–42T ball and ring method, and which are available commercially under the trade name of "Staybelite" resin. Ethyl cellulose is the preferred synthetic polymeric material for the purposes of this invention.

In carrying out the procedure of this invention, the bolts or other threaded fastenings are first prepared by degreasing in known manner. A metered quantity of the locking composition is then applied to the threaded portion of the fastening in a location where contact with the mating thread of the nut or other threaded member is assured. It has been found in practice that the first thread at the extreme point of the fastening should be kept free of the locking composition, for ease in starting in a nut or tapped hole. An excessive amount of the locking composition should be avoided, because the excess composition accumulates under the shoulder of the bolt or on the washer face of the nut, and some of the excess material falls out during driving and may interfere with, or damage, associated structures such as electrical units. When applying the composition, the fastening should be rotated continuously in order to promote uniform application, and in such a manner that the locking composition does not flow onto the adjacent threads while in the liquid state.

After application, the treated bolt is subjected to heat so as to drive off the solvent and to raise the temperature of the locking composition high enough to soften the resinous composition and flux it at least partially, and thus assure smooth and uniform mixing of the components thereof and distribution of the composition upon the threads of the bolt.

In practice, it has been found that with ½–13 x 2¼ inch cap screws, the approximate minimum quantity of the dried (solvent-free) locking composition required to provide satisfactory torque results in all classes of fits is about .06 gram, while the approximate maximum allowable quantity is about .09 gram. It has also been found that the locking composition should be confined to about four complete threads of these screws, for best results.

Proportionately larger or smaller amounts of the locking composition are used on proportionately larger or smaller fastenings.

Figure 2:
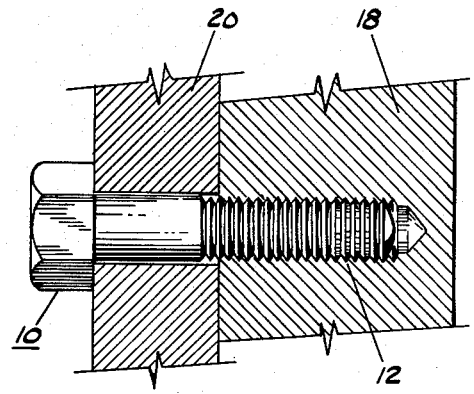
Figure 3:
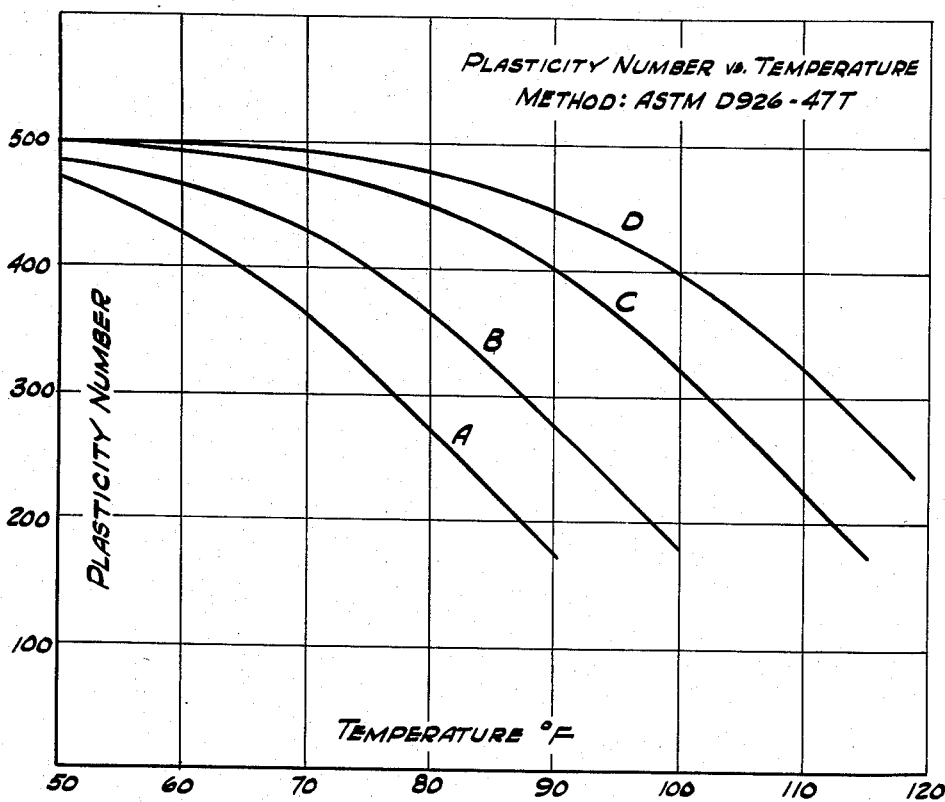

This invention will be further illustrated by reference to the accompanying drawings, which are to be considered as illustrative rather than limiting, and in which FIG. 1 is a side view of a cap screw coated in accordance with this invention;

FIG. 2 is a side view of the cap screw of FIG. 1 in position within an assembly which is in section; and FIG. 3 is a graph showing plasticity number vs. temperature of suitable locking compositions in accordance with this invention.

In FIG. 1, the cap screw 10 is shown with a coating 12 applied to about four complete threads, leaving the first thread 16 clear, as described above. The threads 14 near the head of the screw are preferably uncoated.

In FIG. 2, the cap screw 10 is shown in position holding together elements 18 and 20 in the usual position for cap screws. The coating which locks the screw in place is shown diagrammatically at 12.

Typical illustrations of the locking compositions of this invention are shown in the following examples which are to be considered as illustrative rather than limiting.

Example I

| | Parts by weight |
|---|---|
| Hydrogenated ester of rosin ("Staybelite" resin) | 100 |
| Ethyl cellulose Type N–50 | 15 |
| Orthonitrobiphenyl (plasticizer) | 17½ |
| Toluene (solvent) | 60 |
| Methanol (solvent) | 15 |

Ethyl cellulose Type N–50 has an ethoxyl content of about 47½–49% and viscosity limits, at 5% concentration by weight at 25° C. in 80–20 toluene-ethanol mixture of 40 to 52 centipoises on a sample dried 30 minutes at 100° C.

These ingredients are mixed at room temperature, or at a higher temperature if desired to promote mixing. The solvents dissolve the other ingredients to form a viscous locking composition satisfactory for the purposes of this invention. It is applied to the bolts or other fastenings, dried to remove solvent, and heated to flux the resinous composition, in the manner described hereinabove.

In the application of the composition of this Example I to ½–13 x 2¼ inch cap screws, using a quantity of the dried locking composition as hereinbefore specified for satisfactory torque results, and confined to about four complete threads, the prevailing torque for the first removal will be about 75 inch-pounds, and for the fifth removal about 50 inch-pounds.

Example II

In place of the plasticizer of Example I, an equal weight of dioctyl phthalate may be used, resulting in a locking composition of satisfactory properties for the purposes of this invention.

Example III

| | Parts by weight |
|---|---|
| Hydrogenated ester of rosin ("Staybelite" resin) | 100 |
| Ethyl cellulose Type N–50 | 20 |
| "Santicizer 140" (cresyl diphenyl phosphate) | 10 |
| Xylene (solvent) | 130 |

These ingredients are mixed as described in Example I, to give a locking composition which is satisfactory for the purposes of this invention.

The effects of using ethyl celluloses of different viscosities are shown in the following examples, which are carried out in the manner of Example III and give good results for the purposes of this invention:

Example IV

| | Parts by weight |
|---|---|
| Hydrogenated ester of rosin ("Staybelite" resin) | 100 |
| Ethyl cellulose Type N–200 | 60 |
| "Santicizer 140" | 40 |
| Xylene (solvent) | 350 |

Example V

| | Parts by weight |
|---|---|
| Hydrogenated ester of rosin ("Staybelite" resin) | 100 |
| Ethyl cellulose Type N–7 | 90 |
| "Santicizer 140" | 10 |
| Xylene (solvent) | 208 |

The Type N–7 and Type N–200 ethyl celluloses have the characteristics given above for the Type N–50 except that their viscosity limits under the stated conditions are 6 to 8 centipoises for the Type N–7 and 150–250 centipoises for the Type N–200. The increased viscosity of the ethyl cellulose Type N–200 in Example IV is counteracted by use of a larger amount of plasticizer. Such variations in composition are useful in adjusting the characteristics of the final product. Thus, the composition of Example V gives a product which has a somewhat higher melting point and hence is suitable for self-locking bolts which are to be subjected to higher temperatures than those of the preceding examples.

As already stated, of the two principal ingredients the hydrogenated ester of rosin is present in major amount and ethyl cellulose in minor amount, with respect to each other. Specifically, for every 100 parts of the former there should be at least about 10 parts, but not more than about 90 parts, of the latter, parts being by weight. The amount of plasticizer may vary considerably, depending upon the characteristics of the two principal ingredients and those desired in the final composition. As indicated in the examples, we have used as much as 40 parts of plasticizer per 100 parts "Staybelite" resin, when using 60 parts Type N–200 ethyl cellulose. We have also used as little as 5 parts plasticizer as indicated below. About 5 parts to about 45 parts is a good working range. The amount of solvent used is sufficient to dissolve the other components and provide a composition which can be effectively applied by the particular means of application employed in any given instance. Excess solvent should be avoided, as it causes the composition to run off the fastening on application thereto, so that an insufficient amount of the coating may be applied.

The viscosity of the solid coating, after removal of the solvent and in position on the bolt, is a necessary criterion of a suitable composition for the purposes of this invention. This viscosity may be measured by the parallel plate plastometer as described in ASTM D926–47T, and is recorded as the plasticity number. Solid final coatings on the bolt threads, prepared in accordance with the present invention, must have a plasticity number of about 350 to 500 at 70° F., about 175 to 450 at 90° F., and about 100 to 400 at 100° F. These properties can be attained by varying the solid ingredients of the composition, and more specifically the ethyl cellulose and the plasticizer. A further example, showing variations in the amount of plasticizer while keeping constant the amounts of the other ingredients, is as follows: In Example III, the lower limits of plasticity number just referred to are attained by raising the amount of the plasticizer to 15 parts, while the upper limits are attained by lowering the amount to 5 parts. The dried coating obtained from Example III exhibits a plasticity number of about 275 at 90° F. and about 175 at 100° F.; these numbers are respectively about 400 and 325 when the amount of plasticizer in Example III is reduced to 7½ parts.

After application, the coated fastenings are dried, preferably with heat, so as to remove the solvent or at least the major part of it, and flux the composition, as already stated; after cooling, the final dried composition of this invention is left in place on the threads of the fastenings.

This is a continuation-in-part of our copending application Serial No. 566,751 filed February 20, 1956.

We claim:

1. A screw-threaded fastening member having a coating of a composition which is tough and cohesive and is firmly adherent to the threads of said member throughout repeated engagements and disengagement thereof with a complementary threaded member, said composition consisting essentially of a homogeneous mixture of 100 parts hydrogenated ester of rosin having a softening range between 60° C. and 100° C., about 10 to 90 parts ethyl cellulose, and about 5 to 50 parts plasticizer, parts being by weight, said composition having a plasticity number, as determined by the parallel plate plastometer, of about 175 to 450 at 90° F. and about 100 to 400 at 100° F., said coating being fluxed on said fastening member.

2. A screw-threaded fastening member having a coating of a composition which is tough and cohesive and is firmly adherent to the threads of said member throughout repeated engagements and disengagements thereof with a complementary threaded member, said composition consisting essentially of a homogeneous mixture of 100 parts hydrogenated ester of rosin having a softening range between 60° C. and 100° C., about 10 to 40 parts ethyl cellulose, and about 5 to 17½ parts plasticizer, parts being by weight, said composition having a plasticity number, as determined by the parallel plate plastometer, of about 175 to 450 at 90° F. and about 100 to 400 at 100° F., said coating being fluxed on said fastening member.

3. A screw-threaded fastening member having a coating of a composition which is tough and cohesive and is firmly adherent to the threads of said member throughout repeated engagements and disengagements thereof with a complementary threaded member, said composition consisting essentially of a homogeneous mixture of 100 parts hydrogenated ester of rosin having a softening range between 60° C. and 100° C., 10 to 25 parts of ethyl cellulose, and 5 to 15 parts of a plasticizer, parts being by weight, said composition having a plasticity number, as determined by the parallel plate plastometer, of about 175 to 450 at 90° F. and about 100 to 400 at 100° F., said coating being fluxed on said fastening member.

References Cited in the file of this patent

UNITED STATES PATENTS

| | | |
|---|---|---|
| 2,321,414 | Parker | June 8, 1943 |
| 2,394,101 | Philips et al. | Feb. 5, 1946 |
| 2,423,171 | Boak | July 1, 1947 |
| 2,698,250 | Leichner | Dec. 28, 1954 |
| 2,901,099 | Krieble | Aug. 25, 1959 |

FOREIGN PATENTS

| | | |
|---|---|---|
| 853,927 | Germany | Oct. 30, 1952 |
| 514,296 | Canada | July 5, 1955 |